US008186930B2

(12) United States Patent
Gaghis

(10) Patent No.: US 8,186,930 B2

(45) Date of Patent: May 29, 2012

(54) APPARATUS FOR MOVING A WHEELCHAIR INTO AND OUT OF A VEHICLE

(76) Inventor: Igor Gaghis, Christchurch (NZ)

( * ) Notice: Subject to any disclaimer, the term of this patent is extended or adjusted under 35 U.S.C. 154(b) by 0 days.

(21) Appl. No.: 12/994,866

(22) PCT Filed: Jun. 4, 2009

(86) PCT No.: PCT/NZ2009/000096

§ 371 (c)(1), (2), (4) Date: Nov. 29, 2010

(87) PCT Pub. No.: WO2009/148333

PCT Pub. Date: Dec. 10, 2009

(65) Prior Publication Data

US 2011/0076121 A1 Mar. 31, 2011

(30) Foreign Application Priority Data

Jun. 5, 2008 (NZ) ........................................ 568878

(51) Int. Cl.
*B60P 3/06* (2006.01)

(52) U.S. Cl. ........................................................ 414/462

(58) Field of Classification Search .................. 414/462, 414/921, 546

See application file for complete search history.

(56) References Cited

U.S. PATENT DOCUMENTS 4,096,955 A * 6/1978 Dake ............................. 414/541
4,155,587 A * 5/1979 Mitchell .................... 296/65.12
4,661,035 A 4/1987 Danielsson
4,786,072 A * 11/1988 Girvin ........................ 280/304.1
5,308,214 A * 5/1994 Crain et al. ................... 414/541
5,746,563 A 5/1998 Steckler
7,402,019 B2 * 7/2008 Alexander .................... 414/462

FOREIGN PATENT DOCUMENTS

| | | |
|---|---|---|
| EP | 0563892 | 10/1993 |
| GB | 2202202 | 9/1988 |
| WO | WO 2006/006145 | 1/2006 |

* cited by examiner

*Primary Examiner* — Charles A Fox

(74) *Attorney, Agent, or Firm* — Galbreath Law Offices, P.C.; John A. Galbreath

(57) ABSTRACT

Apparatus for moving a wheelchair into and out of a vehicle, said apparatus including: —an anchorage configured to be secured to the floor of a vehicle and to provide a pivotal mounting for said apparatus; —the first portion and a second portion; —the first portion being configured to move in a substantially horizontal plane; —the first portion including a main support member which is pivoted at one end to the anchorage and which carries the second portion at the other end; —the second portion being configured to move in a substantially vertical plane; —the second portion carrying means for securing a wheelchair thereto; —first moving means for moving the first portion relative to the anchorage; —second moving means for moving the second portion; —wherein the apparatus is dimensioned and configured such that a wheelchair secured' to the second portion is movable between a first, fully stored position in a luggage compartment of a vehicle and a second position in which a wheelchair is at a specified position relative to the vehicle; —and wherein said means for securing a wheelchair are such that in the fully stored position, the or each wheelchair axle is substantially perpendicular to the longitudinal axis of the vehicle.

16 Claims, 7 Drawing Sheets

APPARATUS FOR MOVING A WHEELCHAIR INTO AND OUT OF A VEHICLE

FIELD OF THE INVENTION

The present invention relates to apparatus for moving a wheelchair into and out of a vehicle. More specifically, the apparatus of the present invention supports and moves a wheelchair from the rear luggage compartment of a vehicle to a specified position, e.g. adjacent the driver's door of the vehicle.

BACKGROUND OF THE INVENTION

Many disabled people are capable of driving a vehicle, but are not capable of getting a wheelchair into or out of a vehicle. To avoid the need for such people to seek assistance at each end of a vehicle journey, it is necessary to provide some means for storing a wheelchair in the vehicle, together with means for moving the wheelchair between the storage position and a position in which the wheelchair can be accessed by the driver.

A device of this type is disclosed in U.S. Pat. No. 5,746,563, and also in PCT/IL 2005/000668. However, both of these inventions relate to a collapsible wheelchair, which is moved and stored in the collapsed position. It should be noted that although PCT/IL-2005/000668 states that the invention disclosed in that application can be used in combination with non-collapsible chairs, to adapt the mechanism in that way requires a vehicle which provides an unusually large rear luggage compartment (e.g. a small van).

It is a substantial practical advantage if apparatus for moving a wheelchair can be accommodated in the small to medium-sized hatchbacks and station wagons commonly in use, and if the apparatus is capable of handling a rigid (i.e. non-collapsible) wheelchair. Rigid wheelchairs are preferred by many wheelchair users, since they are regarded as more comfortable and are more robust in use.

SUMMARY OF THE INVENTION

The present invention provides apparatus for moving a wheelchair into and out of a vehicle, said apparatus including:— an anchorage configured to be secured to the floor of a vehicle and to provide a pivotal mounting for the said apparatus;

a first portion and a second portion;

the first portion being configured to move in a substantially horizontal plane;

the first portion including a main support member which is pivoted at one end to the anchorage and which carries the second portion at the other end;

the second portion being configured to move in a substantially vertical plane;

the second portion carrying means for securing a wheelchair thereto;

first moving means for moving the first portion relative to the anchorage;

second moving means for moving the second portion;

wherein the apparatus is dimensioned and configured such that a wheelchair secured to the second portion is movable between a first, fully stored position in a luggage compartment of a vehicle and a second position in which a wheelchair is at a specified position relative to the vehicle;

and wherein said means for securing a wheelchair are such that in the fully stored position, the or each wheelchair axle is substantially perpendicular to the longitudinal axis of the vehicle.

As used herein, the term "wheelchair axle" means the axle of the or each of the large wheels of the wheelchair.

It should be noted that a rigid wheelchair has a single axle; a collapsible wheelchair has two separate aligned axles, one for each wheel.

If the apparatus of the present invention is used for a rigid wheelchair, then preferably the means for securing the wheelchair engage the wheelchair axle.

Preferably, the means for moving the first portion relative to the anchorage and the means for moving the second portion are telescopic type actuators, most preferably electric actuators of known type. However, the moving means could be hydraulic actuators, powered by a common motor. As used herein, the term 'telescopic type actuator' means an actuator which telescopically extends or contracts length when actuated.

In most cases, the apparatus is required to move a wheelchair from the stored position to a position adjacent the driver's door of the vehicle, because it is most commonly the vehicle driver who requires this facility. However, it would of course be possible to use the apparatus of the present invention to move the stored wheelchair to a position adjacent any of the passenger doors instead:—the apparatus of the present invention can be designed for either left-hand drive or right-hand drive vehicles, so the appropriate option can be selected, depending upon where the wheelchair is required to be positioned.

Preferably, the main support member is L-shaped in plan with a shorter limb and a longer limb, and the end of the main support member which is pivoted to the anchorage is the free end of the shorter limb.

Preferably, the apparatus is proportioned and dimensioned such that, as the wheelchair is moved between said first and second positions, the axle of a wheelchair carried by the second portion remains substantially parallel to the longer limb of the main support member for a major proportion of said movement.

Preferably, said apparatus further includes control means for controlling said first and second moving means, said control means being configured to initially operate said first moving means to move said first portion and said second portion to a first predetermined position and then to operate said second moving means to move said second portion to a second predetermined position.

Preferably, said second portion includes a pair of arms arranged to pivot in a substantially vertical plane, the upper ends of said arms being pivotally connected together, the lower end of one of said arms carrying said means for securing a wheelchair thereto, and the lower end of the other of said arms being connected to said first portion.

BRIEF DESCRIPTION OF THE DRAWINGS

By way of example only, a preferred embodiment of the present invention is described in detail, with reference to the accompanying drawings, in which:—

Figure 1:
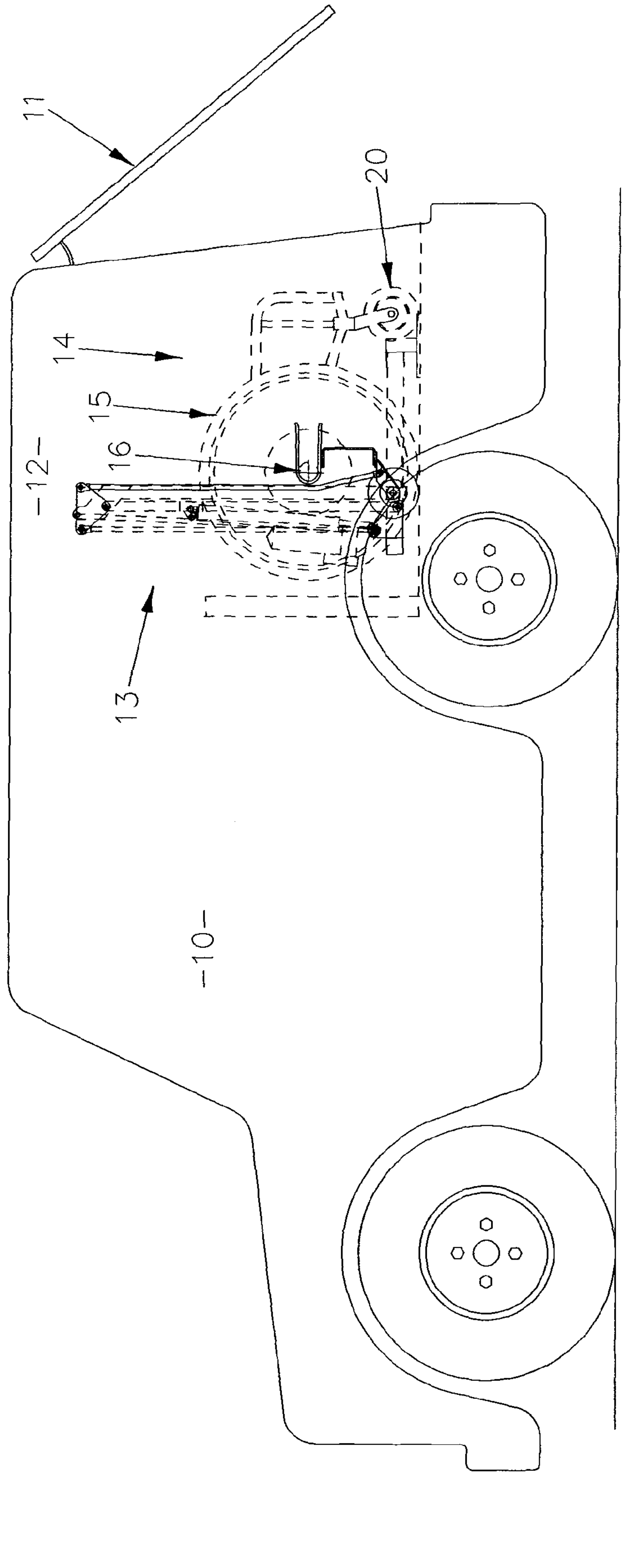
FIG. 1 is a diagrammatic side view showing a wheelchair supported by an apparatus in accordance with the present invention, in the stored position inside the rear of the vehicle.

It should be noted that the drawings show the apparatus of the present invention set-up for a left-hand drive vehicle. The apparatus is mirror-imaged for a right-hand drive vehicle.

DETAILED DESCRIPTION OF PREFERRED EMBODIMENT OF THE INVENTION

Referring to the drawings, a vehicle 10 is a small to medium-sized hatchback having a rear opening hatch 11 which opens into a full height luggage compartment 12. Apparatus 13 (only part of which is visible) is rigidly mounted inside the luggage compartment 12 and supports a rigid (i.e. non-collapsible) wheelchair 14 which is shown in the stored position, in which its wheels 15 lie in substantially vertical planes and the axle 16 extending between the wheels 15 is substantially perpendicular to the longitudinal axis of the vehicle 10.

The wheelchair 14 may be any of a wide range of known designs of wheelchair, and is not shown in detail. The wheelchair 14 actually depicted in the drawings is a commonly available type of rigid wheelchair in which the wheels 15 both are provided with a spaced rim 17 for manual rotation of the wheelchair, a back rest 18 which is shown folded down on top of a seat (not visible), a footrest 19 and front wheels 20. However, it will be appreciated that the apparatus of the present invention can be used to move most, if not all, types of rigid wheelchairs, manually movable or powered, (within the weight carrying limit of the unit) and also could be used to move collapsible wheelchairs with an appropriate adjustment to the wheelchair gripping mechanism hereinafter described.

The apparatus 13 can be subdivided into a first portion 13*a*, which moves in a substantially horizontal plane, and which moves and supports a second portion 13*b*, which moves in a substantially vertical plane. The wheelchair 14 is carried by the outer part of the second portion 13*b*.

The apparatus 13 is pivotally mounted upon an anchorage 25 which is secured to the floor of the vehicle 10 a short distance from the rear of the luggage compartment, on the driver's side of the vehicle.

The first portion 13*a* includes an arm 26 which is pivoted at one end by a pivot 25*a* to the anchorage 25, and at the other end is pivoted by a pivot 27 to one end of an L-shaped linkage 28. The bend of the linkage is connected by a pivot 29 to one end of a stay 30; the other free end of the linkage 28 is pivoted by a pivot 31 to the main support member 32, a short distance away from one end 33 of the main support member. The end 33 of the main support member 32 is pivoted to the anchorage 25 by a pivot 34.

The main support member 32 is L-shaped; the shorter portion of the L terminates in the pivot 34 and the longer portion of the L supports a first electric actuator 40, and is connected to the second portion 13*b* at its free end.

A bracket 36 is roughly triangular in plan; one apex of the triangle is pivoted to the shorter limb of the main support member 32 adjacent the bend of the L, by a pivot 37. A second apex is pivoted by a pivot 38 to the other end of the stay 30. The third apex is pivoted by a pivot 39 to one end of the first actuator 40; the other end of the actuator 40 is pivoted by a pivot 41 to a bracket 42 which is rigidly secured to the longer limb of the main support member 32. A stay 43 is pivoted at one end to the bracket 36, by a pivot 44, and at the other end to a plate 45 by a pivot 46.

The plate 45 is pivoted by a pivot 47 to the end of the longer portion of the main support member 32 and also is welded to one end of a member 49, the other end of which is pivoted by a pivot 50 to a support bracket 51. A stay 52 is pivoted between the bracket 51 and the longer portion of the main support member 32 at pivots 53, 54 respectively. The member 49, stay 52 and pivots 47,50,53,54 together form a trapezium linkage.

The bracket 51 also supports the second portion 13*b* of the apparatus.

Figure 5:
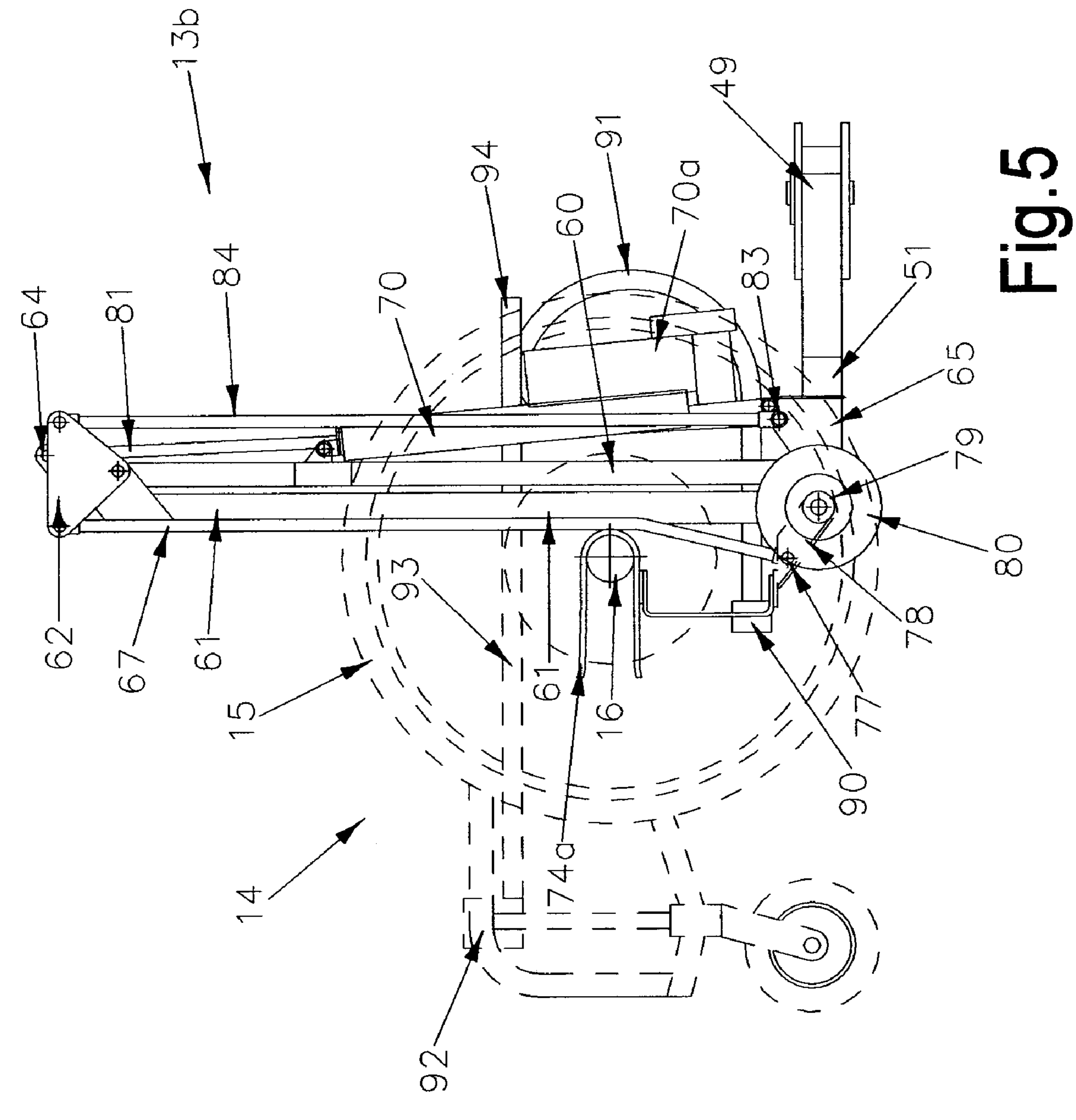
FIG. 5 is a side view of the second portion of the apparatus, in the fully retracted position.
Figure 6:
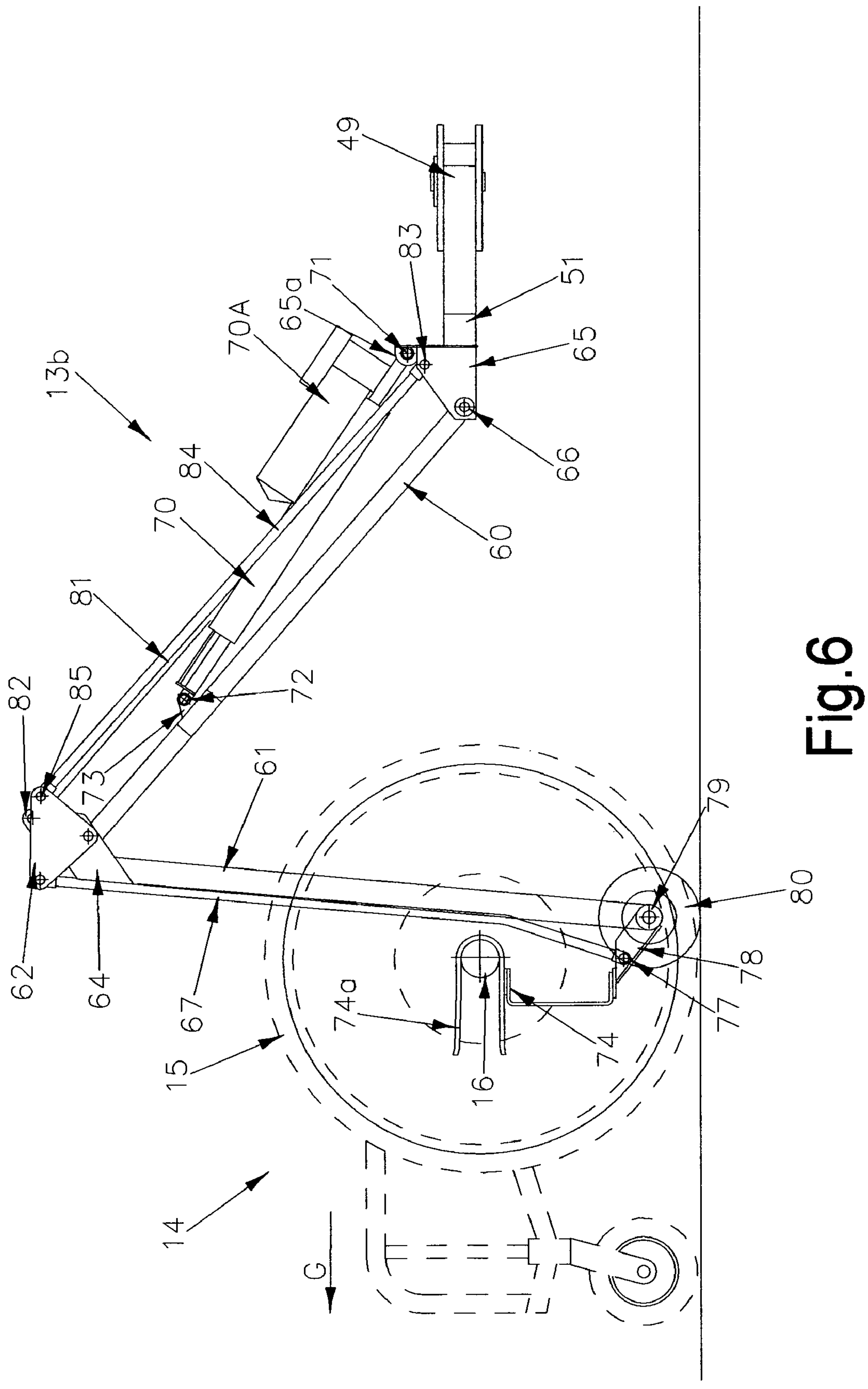
FIG. 6 is a side view similar to FIG. 5, but with the second portion partly extended.
Figure 7:
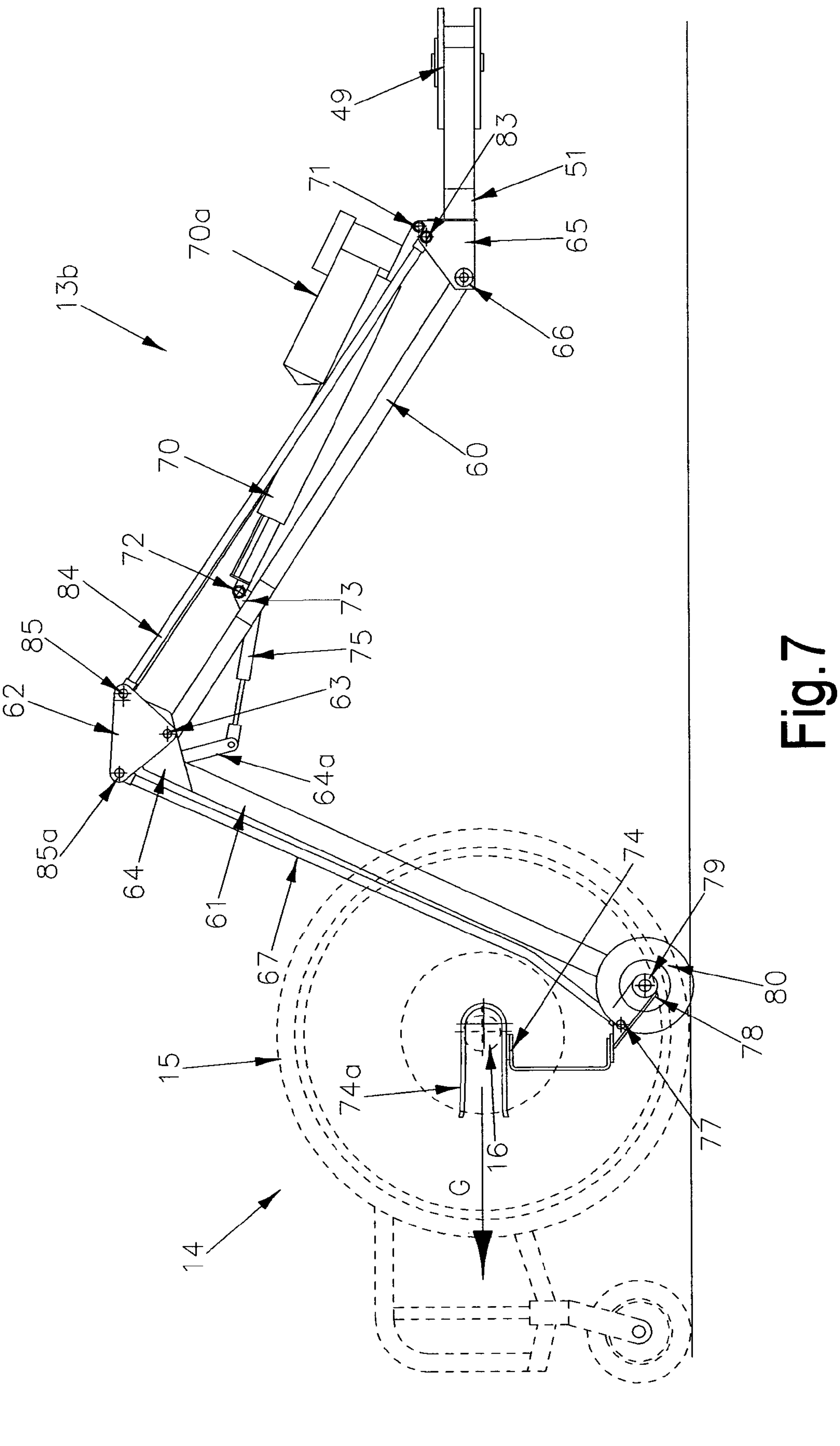
FIG. 7 is a side view similar to FIGS. 5 and 6, but with the second portion further extended.

As shown in greater detail in FIGS. 5-7, the portion 13*b* consists of two arms, 60, 61 which are arranged to pivot in a substantially vertical plane and the upper ends of which are pivotally connected together by a pivot 63 which extends through the upper end of arm 60 and through a pair of plates 64 rigidly secured one each side of the upper end of the arm 61.

The lower end of the arm 60 is pivoted between a pair of spaced parallel brackets 65 by a pivot 66; the brackets 65 are rigidly mounted on the outer end of the bracket 51.

A second electric actuator 70 (shown in FIGS. 5-7 only) is pivoted at its lower end by a pivot 71 between brackets 65*a* rigidly mounted on the bracket 51, and is pivoted at its upper end by a pivot 72 to a bracket 73 rigidly secured approximately two thirds along the length of the arm 60. A gas strut 75 (FIG. 7 only) is pivoted between the arm 60 and an extension 64*a* formed on one of the plates 64.

The lower end of the arm 61 carries an axle 79, the ends of which carry a pair of spaced jockey wheels 80. The wheels 80 engage the ground when the apparatus is partly extended, as hereinafter described.

The arms 60,61 are provided with a parallelogram linkage arrangement of stays 67,84 to hold the wheelchair carried by the arm 61 in a stable position relative to the ground as the arm 61 moves away from arm 60 when the apparatus is extended. The parallelogram linkage is formed by the stays 67 and 84 and the connecting pair of brackets 62. The brackets 62 are a parallel pair of triangular brackets mounted on the pivot 63, which passes through the lower apex of the triangles.

The stay 84 is pivoted between a pivot 83 on the brackets 65 and a pivot 85 extending between two of the upper apices of the brackets 62. The stay 67 is angled at its lower end, at which it is pivoted by a pivot 77 to a plate 78 mounted on the axle 79. The upper end of the stay 67 is pivoted by a pivot 85*a* extending between the other two upper apices of the brackets 62.

A further stay 81 is pivoted between a pivot 82 on the plates 64 and the pivot 83 on the brackets 65. The pivot 82 is journalled in a slot (not visible) in the plates 64, to allow linear movement of the pivot 82 relative to the plates 64.

The arm 61 carries a crossbar 74 which lies in a substantially horizontal plane and the ends of which support a pair of spaced U-shaped spring clips 74*a* which are arranged to resiliently engage the main axle 16 of the wheelchair 14. The arm 61 also supports a bracket 90 (FIG. 5 only) which extends horizontally out to one side of the apparatus, on the driver's side of the vehicle when the apparatus is fully extended, and supports one end of a safety guard 91 the outer end of which carries a safety catch 92. The safety guard 91 is U-shaped and includes an upper substantially horizontal arm 93 which has the safety catch 92 mounted on one end and a U-shaped retainer 94 mounted on the other end.

When the wheelchair 14 is mounted on the apparatus 13, the spring clips 74*a* engage the main axle 16 of the wheelchair, the retainer 94 engages the rear of one of the wheels 15 of the wheelchair and helps to align the wheelchair correctly on the apparatus, and the safety catch 92 (which may be any suitable type of quick release to catch) engages a side support member of the wheelchair.

Figure 2:
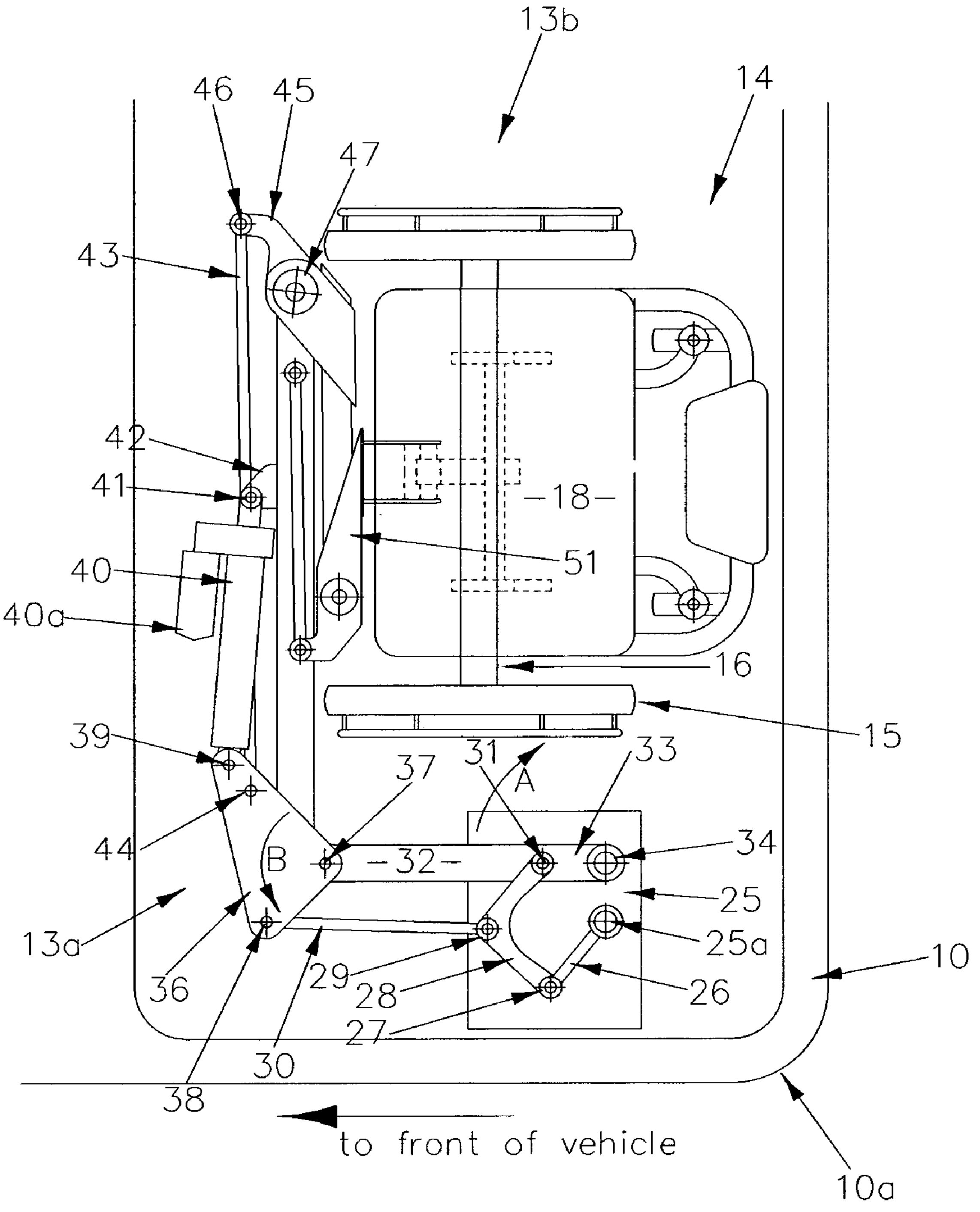
FIG. 2 is a plan view showing the apparatus of the present invention supporting a wheelchair in the stored position in the rear of a vehicle.

The above described apparatus operates as follows:—in the fully stored position of the wheelchair shown in FIGS. 1 and 2, the wheelchair 14 sits across the luggage compartment 12 of the vehicle 10, with the wheels 15 of the wheelchair lying in substantially vertical planes and with the axle 16 of the wheelchair substantially perpendicular to the longitudinal axis of the vehicle. It should be noted that in the fully stored position, the wheelchair sits adjacent to the rear door of the luggage compartment, with the apparatus 13 between the wheelchair and the back of the seats. This means that, in the event of a power failure, the wheelchair can be removed from the vehicle manually if necessary.

The apparatus 13 is designed to carry the wheelchair out of the luggage compartment 12, pivot around the rear driver's side corner of the vehicle, and then move it until the wheelchair lies at a selected position, typically opposite or near the driver's door, so that the wheelchair can be manually released from the apparatus by the driver, and the wheelchair is then ready to use. The drawings depict the apparatus as designed for a left-hand drive vehicle.

The proportions and dimensions of the various stays and support members in the apparatus can be varied as necessary to accommodate different weights of wheelchairs and different sizes of vehicle.

The two electric actuators 40,70 each are powered by their own motors 40*a*,70*a*, respectively; these motors are controlled in known manner by a control, system manually operated by the driver. The control system and motors may be of any suitable known type and are not described in detail. The control system is set to operate the actuators 40 and 70 in a predetermined sequence, as hereinafter described.

Before the apparatus 13 can be used, the rear hatch 11 of the vehicle 10 must be opened; many vehicles are fitted with a driver controlled automatic hatch release, but if a vehicle is being used which is not fitted with such a device, then the vehicle may be fitted with a known design of hatch opening mechanism, e.g. operated by a third actuator (not shown).

Once the hatch 11 is opened, the driver operates the motor control to start the motor 40*a* and operate the first actuator 40. As the actuator 40 extends, it pivots the bracket 36 on the pivot 37. This tends to swing the bracket 28 in the direction of Arrow A, and thus starts to pivot the main support member 32 about the pivot 34, in the direction of arrow A.

As the actuator 40 extends, it pivots bracket 36 about pivot 37 in the direction of Arrow B; this pulls on the stay 43 which is attached to pivot 46 on bracket 45, and thus pivots bracket 45 about pivot 47. This swings the bracket 45 relative to the main support member 32, and effectively pushes the wheelchair 14 out of the rear of the luggage compartment.

However, the trapezium linkage formed by member 49, stay 52 and pivots 47,50,53 and 54 maintains the orientation of the portion 13*b* relative to the longer limb of the support member 32, such that the axle 16 of a wheelchair carried by the portion 13*b* remains substantially parallel to the longer limb of the support member 32 throughout. It should be noted that the angle of the axle 16 to the longer limb of the support member 32 in FIG. 3 is exaggerated for clarity.

Further extension of the actuator 40 continues to move the main support member 32 in the direction of Arrow A so that the main support member 32 pivots about the pivot 34. Since the pivot 34 is secured to one side of the luggage compartment floor and the main support member 32 is L-shaped, the rotation of the main support member 32 about the pivot 34 not only moves the wheelchair 14 out of the rear of the luggage compartment, but also swings the wheelchair 14 around the rear end 10*a* of the vehicle on the driver's side through the position shown in FIG. 3 and then to the position shown in FIG. 4.

Figure 3:
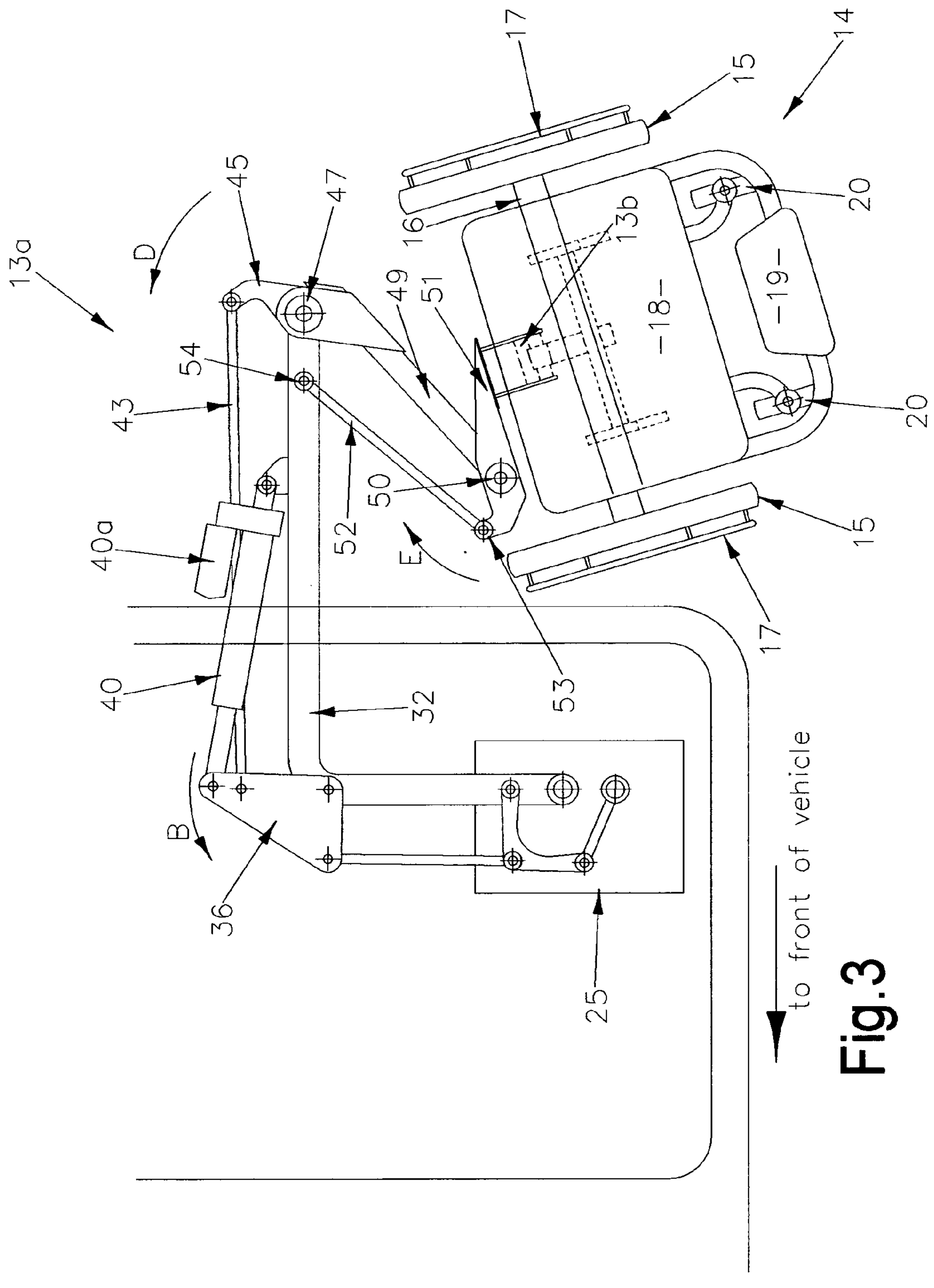
FIG. 3 is a view similar to FIG. 2, but showing the apparatus partly extended to move the wheelchair out of the vehicle.
Figure 4:
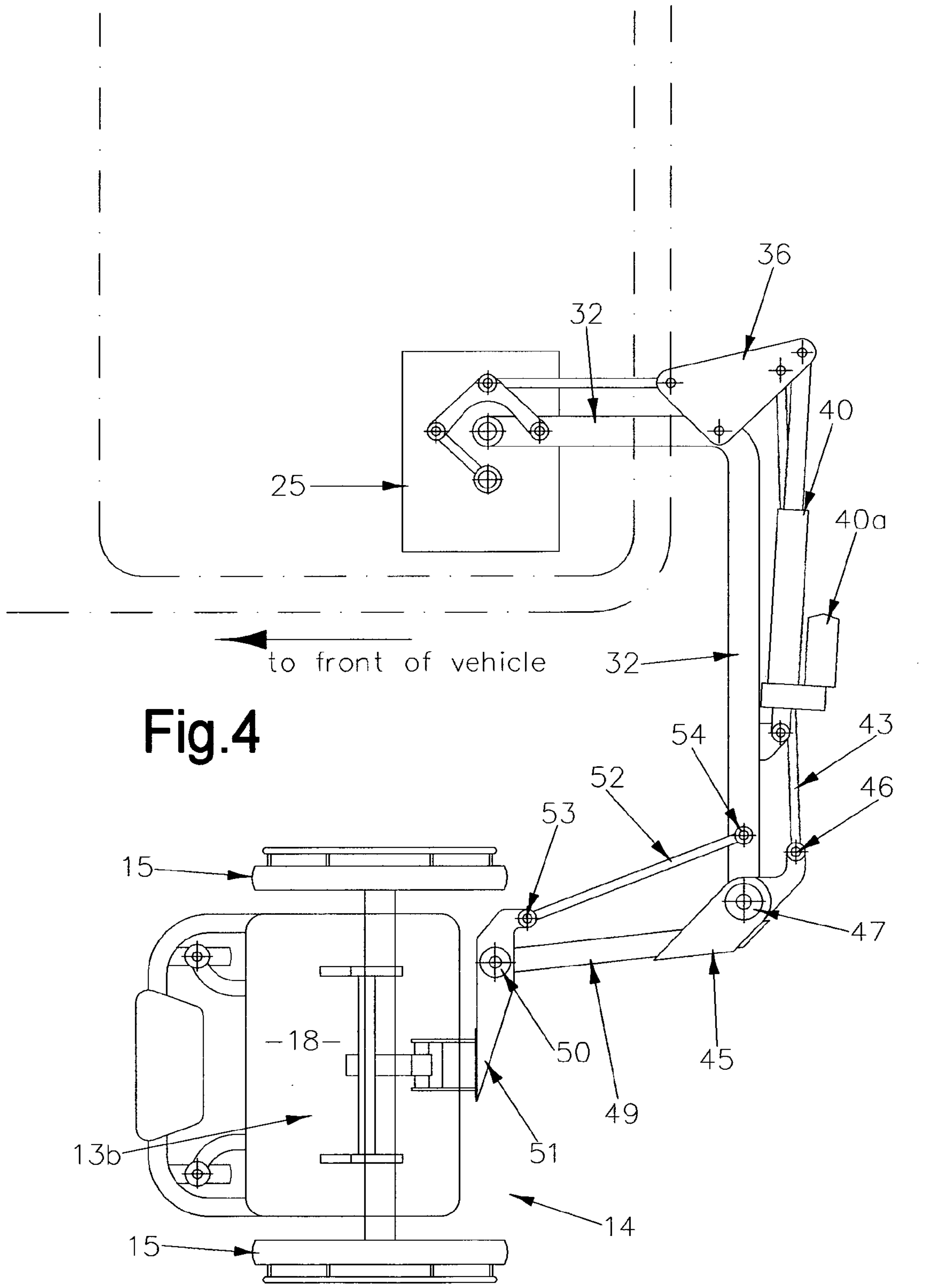
FIG. 4 is a view similar to FIG. 2 and FIG. 3, showing the apparatus further extended.

As the apparatus moves between the positions shown in FIGS. 3 and 4, the movement of the bracket 36 in the direction of Arrow B, with the consequent tension on the stay 43, continues to pivot the bracket 45 in the direction of Arrow D, pivoting the member 49 about pivot 47 and pivoting stay 52 about the pivots 53 and 54, and turning bracket 51 in the direction of Arrow E. The overall effect of this is to not only move the main support member 32 so that the longer arm of the member is substantially perpendicular to the longitudinal axis of the vehicle (see FIG. 4) but also to swing member 49 away from the main support member 32 until, in the position shown in FIG. 4, the wheelchair is almost parallel to the side of the vehicle and the member 49 is at a small obtuse angle to longer limb of the main support member 32.

At this position, the actuator 40 is fully extended and triggers a microswitch which shuts off that actuator and starts the second motor 70*a*, to extend the second actuator 70 to pivot the arms 60 and 61 away from each other and thus move the wheelchair forward to its final position adjacent the driver's door.

As the second actuator 70 extends, it pivots the arm 60 outwards and downwards on the pivot 66. The arm 61 which carries the wheelchair tends to swing away from the arm 60 as the arm 60 is moved forwards and downwards, by the actuator 70 and under the weight of the arm 61 and the wheelchair, but this movement is stabilized by the stay 81, which also tends to urge the arm 61 beyond the position at which the longitudinal axis of the arm 61 is perpendicular to the plane of the ground, so that the wheels 80 do not tend to dig into the ground, and jam the arm 61. As the arms 60,61 move apart, the gas strut 75 moves over centre, and then acts to push the arm 61 away from the arm 60. As the arm 61 moves away from the arm 60, the combination of the stays 67 and 84, and the stay 81, stabilize the arm 61 and the wheelchair, relative to the ground, until the wheels 80 engage the ground as the wheelchair moves towards the driver's door. Variations in the height of the ground are accommodated by movement of the stay 81 in the slot which holds the pivot 82.

When the actuator 70 reaches the end of its stroke it triggers a second microswitch and the motor 70*a* is shut off. At this position, the wheelchair typically is opposite or near the driver's door, which the driver has opened, and the driver can simply reach across and release the wheelchair by releasing the safety catch 92 and pulling the wheelchair from the clips 74*a*. The driver then activates the motor control to fold the apparatus 13 back into the luggage compartment; this sequence is not described in detail because it simply reverses the sequence described above. However, it should be noted that the stay 81 assists in closing the arm 61 up to the arm 60 when the apparatus is being retracted. The hatch 11 can then be closed and the driver can manoeuvre himself into the wheelchair.

If the apparatus of the present invention is to be used with a collapsible wheelchair, then the above described apparatus can be used unchanged, simply by fitting a removable dummy axle to the foldable chair and moving the wheelchair in and out of the vehicle in the fully extended for use position. The movable dummy axle is simply a removable bar which extends between the two separate aligned axles used in a collapsible wheelchair. Alternatively, the part of the apparatus which actually holds the wheelchair (crossbar 74, spring clips 74*a*, bracket 90, safety guard 91, safety catch 92 and horizontal arm 93) is replaced by a support mechanism of known type, for releasably supporting a collapsed wheelchair.

The invention claimed is:

1. Apparatus for moving a non-collapsible wheelchair into and out of a vehicle, said apparatus including:

an anchorage configured to be secured to the floor of a vehicle and to provide a pivotal mounting for said apparatus;

a first portion and a second portion;

the first portion being configured to move in a substantially horizontal plane;

the first portion including a main support member which is pivoted at one end to the anchorage and which carries the second portion at the other end;

the second portion being configured to move in a substantially vertical plane;

the second portion carrying means for securing a wheelchair thereto;

first moving means for moving the first portion relative to the anchorage;

second moving means for moving the second portion;

wherein the apparatus is dimensioned and configured such that a wheelchair secured to the second portion is movable between a fully stored position in a luggage compartment of a vehicle and a ready-for-use position in which a wheelchair is at a specified position relative to the vehicle, alongside one of the vehicle's side doors, using only said first and second moving means;

wherein said means for securing a wheelchair include means for releasably engaging the wheelchair rear axle, and wherein said means for securing a wheelchair are such that in the fully stored position, the wheelchair rear axle is substantially perpendicular to the longitudinal axis of the vehicle, and each rear wheel of the wheelchair lies in a substantially vertical plane.

2. The apparatus as claimed in claim 1, wherein said means for securing a wheelchair also include a retainer configured to engage the rear of one of the rear wheels of a wheelchair secured to said apparatus and a manually operable safety catch configured to engage a side support member of said wheelchair.

3. The apparatus as claimed in claim 1, further including control means for controlling said first and second moving means, said control means being configured to initially operate said first moving means to move said first portion and said second portion to a first predetermined position and then to operate said second moving means to move said second portion to a second predetermined position.

4. The apparatus as claimed in claim 3, wherein in use said first predetermined position is alongside the side of a vehicle in which said apparatus is mounted, and said second predetermined position is adjacent the drivers door of said vehicle.

5. The apparatus as claimed in claim 3 wherein said main support member is L-shaped in plan with a shorter limb and a longer limb, and the end of the main support member which is pivoted to the anchorage is the free end of the shorter limb.

6. The apparatus as claimed in claim 5, wherein said apparatus is proportioned and dimensioned such that, when in use a wheelchair is carried by said second portion and is moved between said first and second predetermined positions, the rear axle of the wheelchair remains substantially parallel to the longer limb of the main support member for a major proportion of said movement.

7. The apparatus as claimed in claim 6, wherein said first moving means comprises a telescopic type actuator, one end of which is pivotally connected to the longer limb of the main support member, and the other end of which is pivotally connected to the shorter limb of the main support member and to the anchorage.

8. The apparatus as claimed in claim 5 or claim 7, wherein the free end of the longer limb of the main support member carries a trapezium linkage which supports said second portion.

9. The apparatus as claimed in claim 8, wherein said second portion includes a pair of arms arranged to pivot in a substantially vertical plane, the upper ends of said arms being pivotally connected together, the lower end of one of said arms carrying said means for securing a wheelchair thereto, and the lower end of the other of said arms being connected to said trapezium linkage.

10. The apparatus as claimed in claim 9, wherein said second moving means is a telescopic type actuator, one end of which is pivotally connected to said trapezium linkage, and the other end of which is pivotally connected to the other of said arms.

11. The apparatus as claimed in claim 10, further including a gas strut arranged to move the arms of the second portion apart at a predetermined position of the other of said arms.

12. The apparatus as claimed in claim 9, wherein said pair of arms is stabilised by a parallelogram linkage.

13. The apparatus as claimed in claim 9, wherein the lower end of said one arm is provided with a pair of spaced ground engaging wheels.

14. The apparatus as claimed in claim 1 or claim 3, wherein said second portion includes a pair of arms arranged to pivot in a substantially vertical plane, the upper ends of said arms being pivotally connected together, the lower end of one of said arms carrying said means for securing a wheelchair thereto, and the lower end of the other of said arms being connected to said first portion.

15. The apparatus as claimed in claim 1 wherein said apparatus is configured such that in said fully stored position, a wheelchair carried by said apparatus sits adjacent of the rear door of the luggage compartment of the vehicle.

16. The apparatus as claimed in claim 1, wherein said first moving means and said second moving means each comprise a telescopic type actuator selected from the group consisting of: an electric actuator and an hydraulic actuator.

* * * * *